United States Patent [19]

McLaughlin

[11] 3,758,800

[45] Sept. 11, 1973

[54] RELUCTANCE SYNCHRONOUS MOTORS AND ROTORS FOR SAME

[75] Inventor: Herbert L. McLaughlin, Fort Wayne, Ind.

[73] Assignee: General Electric Company, Fort Wayne, Ind.

[22] Filed: Jan. 24, 1972

[21] Appl. No.: 220,071

[52] U.S. Cl.................. 310/211, 310/162, 310/163
[51] Int. Cl. ............................................. H02k 3/06
[58] Field of Search.................... 310/162, 163, 211, 310/261, 265

[56] References Cited
UNITED STATES PATENTS

| | | | |
|---|---|---|---|
| 2,733,362 | 1/1956 | Bauer et al. ......................... | 310/162 |
| 2,913,607 | 11/1959 | Douglas et al. ................... | 310/211 X |
| 3,243,620 | 3/1966 | Suhr et al. ........................... | 310/162 |
| 3,047,755 | 7/1962 | Angst et al. ......................... | 310/162 |
| 1,915,069 | 6/1933 | Morrill et al. ....................... | 310/163 |

*Primary Examiner*—J. D. Miller
*Assistant Examiner*—Mark O. Budd
*Attorney*—Joseph B. Forman, John M. Stoudt et al.

[57] ABSTRACT

Synchronous reluctance motor with improved rotor which permits use of multiphase or single phase motor with any type of single phase winding arrangement. Single phase motor used with a permanent split capacitor arrangement, provides substantially improved pull-in torque when hot with an attached inertia load, reduced tooth order locking; utilizes a common steel shaft, and common iron rotor laminations. Rotor body includes laminated core of substantially round peripheral configuration having internal saliencies, e.g., a plurality of polar region determining saturable bridges between at least two of which is disposed a path for flux between two adjacent direct axes. Short-circuited squirrel cage winding conductors are positioned in conductor receiving slots. At synchronous speeds, squirrel cage winding forms pairs of poles of opposite polarity at the surface of the rotor, the same in number as the stator pole pairs. Rotor magnetic structure defines one or more direct magnetic axes and one or more quadrature axes and thus at least one pair of rotor polar regions or rotor poles. Direct axes pass through first flux barrier slots with inner ends in the vicinity of, e.g., spaced closely adjacent to the shaft. Adjacent extremities of adjacent first barrier slots are located to form a saturable bridge therebetween. A second type of elongated flux barrier slot is spaced between adjacent first barrier slots and transversely disposed relative to a quadrature axis. Second barrier slots may form saturable bridges with squirrel cage slots. Configuration and arrangement of flux barrier slots establish low reluctance path for direct axis flux and high reluctance path for quadrature axis flux.

24 Claims, 2 Drawing Figures

PATENTED SEP 11 1973  3,758,800

RELUCTANCE SYNCHRONOUS MOTORS AND ROTORS FOR SAME

BACKGROUND OF THE INVENTION

This invention relates generally to reluctance synchronous motors, and more particularly to an improved rotor therefor.

A reluctance synchronous motor incorporates a rotor having a squirrel cage winding therein similar to that employed in an induction motor in that the motor starts as an induction motor. However, various arrangements of external and/or internal slots vary the reluctance of the rotor to form salient magnetic poles so that the motor runs at absolute synchronous speed thus providing synchronous motor performance with induction motor simplicity.

U.S. Pat. No. 1,915,069 to Wayne J. Morrill et al. and 3,047,755 to Gustave Angst et al., both assigned to the assignee of the present application, and U.S. Pat. No. 2,913,607 to John F. H. Douglas et al., disclose, inter alia, rotors for synchronous reluctance motors having various arrangements of flux barrier slots therein for increasing the quadrature axis reluctance of the rotor and thus increasing its saliency. U.S. Pat. No. 1,697,362 to Jaroslaw K. Kostko discloses a wound rotor synchronous motor with the excited rotor winding establishing direct and quadrature axes and utilizing flux barrier slots to minimize current changes in the energized stator winding. FIG. 1 of the drawing of the present application shows (in cross section) a rotor member for a synchronous reluctance motor commercially used previously which incorporates internal direct axis flux barrier slots and external quadrature axis flux barrier slots.

Synchronous reluctance motors in relatively small sizes are employed, for example, in business machine applications that require the motor to start and operate from a single phase power supply. Two of the many examples of such applications are copying machines and computer printers. Various winding arrangements and motor circuit connection arrangements may be used in these applications that require single phase starting and operation. In those applications where it is desirable to not use devices such as centrifugal switch mechanisms or starting relays, it may be particularly advantageous to use "permanent split capacitor" motors. However, in the case of certain prior synchronous reluctance motors, including those having rotors constructed according to FIG. 1 of the drawing, little or no starting torque was provided with the permanent split capacitor arrangements, e.g., because of high pole order locking. In addition, with certain combinations of rotor and stator slots, tooth order locking may reduce the average, net available starting torque.

Synchronous reluctance motors typically exhibit 120 cycle torque pulsations during operation, a manifestation of which may be torsional vibration. Commonly, such pulsations are damped-out with an inertia load, i.e., a flywheel or other rotating mass. In the case of certain prior synchronous reluctance motors, including motors having rotors constructed according to FIG. 1 of the drawing, the pull-in torque with an inertia load and with the motor hot was very substantially reduced. This condition required the use of a larger motor than would otherwise have been needed for a given load.

Another exemplary disadvantage of certain prior art synchronous reluctance motors (including ones having rotors constructed according to FIG. 1 of the drawing) is that non-magnetic shaft material, e.g., stainless steel, must be used as well as silicon steel laminations that require special annealing in the rotor assemblies for such motors.

SUMMARY OF THE INVENTION

Accordingly, it is an object of the present invention to provide an improved rotor core and rotor assembly for a synchronous reluctance motor.

Another object of the invention is to provide an improved rotor for a synchronous reluctance motor which permits use of any desired single phase starting and operating arrangement including a permanent split capacitor arrangement, provides improved pull-in torque when hot with an attached inertia load, permits use of a magnetic or common steel shaft, and permits use of common iron laminations.

In accordance with one form of the invention, I have provided an improved rotor member for a synchronous reluctance motor which permits use of the motor with any type of single phase winding arrangement including a permanent split capacitor arrangement, and that provides substantially improved pull-in torque when hot with an attached inertia load, reduces tooth order locking, may utilize a magnetic common steel shaft, and can use common iron rotor laminations.

In one exemplification, I have provided an alternating current, reluctance synchronous motor which includes a magnetic stator core having a yoke portion with a plurality of teeth extending radially therefrom, the teeth having ends or tips which define a wound peripheral surface region, e.g., a bore or other rotor accommodating locale. A winding is accommodated on the stator core which, when energized, forms a magnetic field having a predetermined number of pairs of poles of opposite polarity. A rotor assembly of a rotor body mounted on a shaft is rotatably positioned adjacent the stator peripheral surface. The rotor body includes a core formed of a stacked plurality of relatively thin magnetic material laminations that, preferably, have a first substantially round peripheral configuration adjacent the round stator peripheral region. In addition, the rotor parts are provided with multiple internal saliencies and the rotor provides improved synchronous pull-in torque under adverse conditions of inertia and heating.

Preferably, the rotor laminations have a substantially round inner shaft accommodating periphery, and round outer periphery; and a plurality of generally equally angularly spaced apart conductor receiving slots adjacent to the outer periphery thereof. Rotor bodies utilizing these laminations have a substantially continuous outer cylindrical laminated surface and short-circuited squirrel cage winding conductors positioned in the conductor receiving slots. At synchronous speeds, the squirrel cage winding forms pairs of poles of opposite polarity at the surface of the rotor, the same in number as the stator pole pairs. The magnetic structure of the rotor, i.e., the rotor laminations, define one or more direct magnetic axes and one or more quadrature axes and thus at least one pair of rotor poles. Pairs of first flux barrier slots, the same in number as the number of stator pole pairs, are provided and a direct axis passes through each of the first flux barrier slots. Each of the first flux barrier slots extend inwardly from a squirrel cage slot and either may have an outer end closely adjacent the squirrel cage slot so as to form a small bridge therebetween or may be in communication with the squirrel cage slot. An inner end of each of the first flux barrier slots may, when desired, be spaced closely adjacent to the shaft. Adjacent extremities of adjacent first barrier slots are located to form a saturable bridge therebetween. A second elongated flux barrier slot is provided spaced between adjacent ones of the first barrier slots. The second flux barrier slots are each generally perpendicularly disposed relative to a quadrature axis. Each second barrier slot is spaced closely adjacent to at least two of the squirrel cage slots so as to form saturable bridges therebetween. The configuration and arrangement of the flux barrier slots establish a low reluctance path for direct axis flux and a high reluctance path for quadrature axis flux.

The subject matter which I regard as my invention is set forth in the appended claims. The invention itself, however, along with further objects and advantages thereof will be understood by reference to the following description taken in conjunction with the accompanying drawing.

DESCRIPTION OF THE PREFERRED EMBODIMENT

Figure 1:
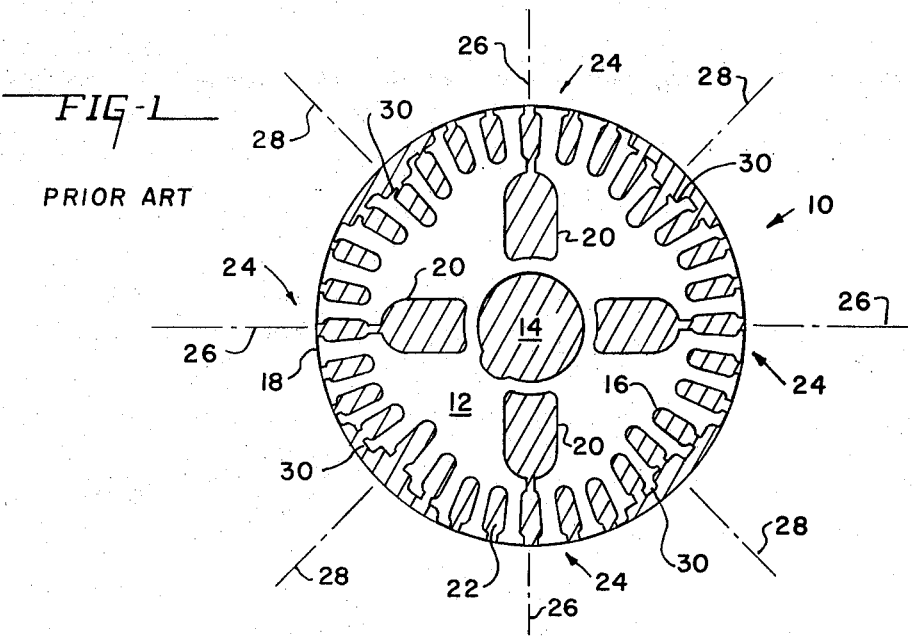
FIG. 1 is a cross-sectional view of a previously known rotor member for a synchronous reluctance motor.

Referring now to the drawing, FIG. 1 is a sectional view of a previously known rotor assembly 10, for a four-pole reluctance synchronous motor, of a type that has been commercially used heretofore. Rotor assembly 10 is formed of a plurality of stacked relatively thin magnetic material laminations 12 mounted on a stainless steel or other substantially nonmagnetic material shaft 14. A plurality (32 being shown) of squirrel cage slots 16 open at the radially outer extremity thereof are formed adjacent the outer peripheral surface 18 of the laminations of the rotor assembly 10. A cast squirrel cage winding is provided having conductors 22 in slots 16.

During synchronous operation, with rotor assembly 10 positioned in the bore of a not shown stator assembly having a four-pole winding, four poles 24 are formed at synchronous speed with a direct axis 26 disposed along each of the poles and quadrature axes 28 disposed therebetween. A direct axis flux barrier slot 20 opens into a squirrel cage slot 16 along each direct axis and each of the direct axis flux barrier slots extend toward shaft 14. External reluctance slots or recesses 30 are formed along the periphery 18 of each of the rotor laminations of rotor member 10 and a quadrature axis 28 passes through each of the slots 30. The external slots 30 and barrier slots 20 are all filled with conductive material, such as aluminum. Preferably the conductive material is formed in place, e.g., by a conventional die-casting process. Direct axis flux barrier slots 20 and reluctance or quadrature axis flux barrier recesses 30 respectively form a low reluctance path for direct axis flux passing between adjacent poles 24 of opposite polarity, and a high reluctance path for quadrature flux in the quadrature axes.

Synchronous reluctance motors incorporating the rotor construction shown in FIG. 1 in a permanent split capacitor motor circuit arrangement provide substantially no useful starting torque, display unsatisfactory pull-in torque (when hot with an attached inertia load), require the use of a nonmagnetic shaft, and require the use of silicon steel laminations.

Figure 2:
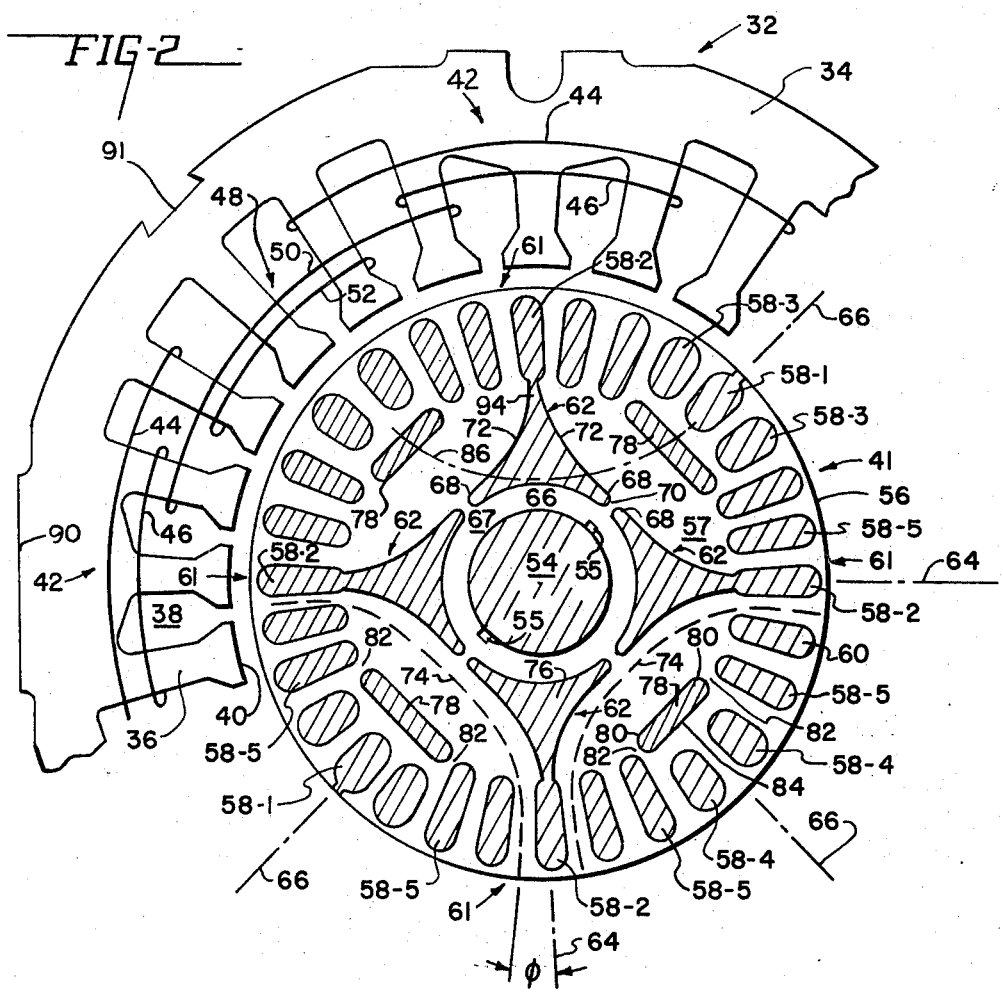
FIG. 2 is a cross-sectional view of one improved dynamoelectric machine including a rotor assembly, with parts broken away and parts shown schematically, exemplifying the invention in one form.

Referring now to FIG. 2 of the drawing, there is shown parts of a stator core assembly 32 having a yoke portion 34 with a plurality of teeth 36 extending inwardly therefrom and forming winding slots 38 therebetween. Teeth 36 have inner ends 40 defining a bore within which the improved rotor assembly 41 is rotatably supported by one or more not shown bearings as will be understood. In the illustrated four-pole embodiment, the laminated core of stator assembly 32 has 24 winding accommodating slots 38. In FIG. 2, a single phase winding is positioned on the stator core in slots 38 and comprises a plurality of coil groups each formed of one or more coils having one or more coil turns. In the illustrated embodiment, four main winding coil groups make up main winding 42 and each of these coil groups is formed of two concentric coils 44, 46. The single phase winding also includes an auxiliary winding 48. Auxiliary or start winding 48 also includes four coil groups each having two coils 50, 52 therein.

During operation, and after the rotor assembly 41 has reached synchronous speed, the main winding 42 forms a moving magnetic field having two pairs of opposite poles in stator core member 32. Stator core member 32 and windings 42, 48 are of a type known heretofore and may be as shown. For the motor assembly shown in FIG. 2, the stator core laminations were generally round in configuration with a bore diameter of about 2.00 inches, a maximum outer diameter of about 3.7 inches, and a dimension across the flats 90 of about 3.6 inches. Four keys or deformed strips, each disposed in a slot 91 on the stator core, held the stator core laminations in assembled relationship, and both the rotor core and stator core utilized about a 3 inch stack of laminations that were about 0.025 of an inch thick. The coils 44, 46 had 124 and 69 turns, respectively, of about 0.020 inch diameter copper magnet wire. The coils 50, 52 had 173 and 100 turns, respectively, of about 0.014 inch diameter copper magnetic wire.

While one specific winding arrangement has now been described, it will be understood that any suitable winding arrangement may be used and that winding material other than copper, e.g., aluminum, may be utilized.

The rotor assembly 41 was fabricated by shrink fitting the assembled rotor body, i.e., a core supported squirrel cage winding on the shaft 54. As will be understood, notches 55 in the rotor laminations may be used for alignment during the lamination stacking operation. The rotor assemby has a finished outer diameter of slightly less than 2 inches when it is to operate in a 2 inch stator bore. A plurality (shown here as thirty) of equally angularly spaced apart squirrel cage slots 58 are formed in each rotor lamination adjacent the outer periphery 56 thereof. In the illustrated embodiment, all of the squirrel cage slots 58 are closed with the exception of two slots 58–1 which are open and are used in order to permit skewing of rotor laminations 57 while manufacturing the rotor as will be understood. I have found that the provision of closed squirrel cage slots is desirable because of an apparent tendency for reduced rotational losses during operation.

After stacking the rotor laminations, a cast squirrel cage winding is provided having conductors 60 in slots 58. At synchronous speed, current induced in the squirrel cage winding establishes two pairs of direct magnetic poles 61 at surface 56 of rotor member 41, on the direct axes 64, with the quadrature axes 66 disposed between the direct axes. It will be noted that in the illustrated embodiment, the quotient resulting from division of the number of squirrel cage slots (30) by the total number of poles (four) is not an integral number and that each direct axis 64 is angularly displaced from a 180 electrical degree relationship with an adjacent direct axis 64 by an angle of plus or minus $\phi$ which, in the illustrated embodiment, is twelve electrical degrees. It will be seen that in the illustrated embodiment, direct axes 64 extend through squirrel cage slots 58–2. It will further be seen that between a first squirrel cage slot 58–2 and a slot 58–2 on either side thereof, there are groups of either seven or six squirrel cage slots. Each group of seven squirrel cage slots includes an open slot 58–1 with a quadrature axes 66 extending therethrough and with a slot 58–3 on either side thereof. Each group of six squirrel cage slots includes two slots 58–4 having a quadrature axis 66 extending therebetween. Slots 58–1, 58–3 and 58–4 are relatively more shallow and wide as compared to the remaining squirrel cage slot 58–2 and 58–5. However, all of the squirrel cage slots have substantially the same cross-sectional area and thus all of the conductors 60 will have substantially the same resistance.

Four direct axis barrier slots 62, relatively deep or long in radial extent, are provided so as to have and outer end 94 joined to (and thus in communication with) a respective slot 58–2. The inner end 66 of each slot 62 is spaced from shaft 54 and thus provide hub portion 67 of each lamination and thus of the rotor core. Each barrier slot 62 is substantially wider at its inner end 66 that at its outer end 94. The inner end 66 of these slots is shown as being arcuate and having opposite extremities 68. Each extremity 68 of a direct axis slot 62 is closely spaced from an extremity 68 of an adjacent slot 62 thereby to form a saturable bridge 70 joined to hub portion 67. The bridge 70 structurally interconnects the hub portion and remainder of each lamination. Sides 72 of each direct axis barrier slot 62 are convexly curved inwardly and each slot 62 is generally symmetrical about its respective direct axis 64. By virtue of the provision of the saturable bridges 70, cross axis flux, (i.e., quadrature axis flux) in excess of that which saturates the birdge 70 is prevented from passing through hub portion 67 and shaft 54. Accordingly, a shaft formed of common magnetic steel may be used since it is not necessary to use stainless steel or other nonferromagnetic shaft material in order to prevent pole to pole leakage of direct axis magnetic flux. It will be understood that the configuration of the sides 72 of direct axis slots 62 generally establish a boundary for the path of direct axis flux flowing between adjacent, opposite poles 61, as shown by dashed lines 74.

Since direct axis barrier slots 62 are joined to and thus communicate with squirrel cage slots 58–2, they are also filled with cast conductive material, as at 76.

Four straight, quadrature axis flux barrier slots 78 are provided each spaced outwardly from a respective pair of direct axis barrier slots 62. Each quadrature axis barrier slot 78 is generally perpendicular to a quadrature axis 66 which passes therethrough and is symmetrical about the respective quadrature axis. Each quadrature axis barrier slot 78 has extremities 80 which are closely spaced from a pair of squirrel cage slots 58–5 to form saturable bridges 82. The outer side 84 of each quadrature axis barrier slot 78 spans and is spaced from three slots 58–1, 58–3, 58–3; or from two slots 58–4, as shown.

It will be seen that the quadrature axis barrier slots 78 and direct axis barrier slots 62 are disposed to reduce, if not prevent, quadrature axis flux flow along the path represented by the dot-dash line 86. It will further be seen that the direct axis barrier slots 62 and quadrature axis barrier slots 78 provide a low reluctance path for direct axis flux along the path represented by lines 74 while providing a high reluctance path for quadrature axis flux along the path denoted by line 86.

Quadrature axis slots 78 preferably will have cast conductive material therein. In those cases where it is desired to maintain barrier slots 78 open and free of conductive material, one lamination on each end of the rotor core stack may be provided without slots 78. As will be understood, the end laminations will then prevent conductive material from entering barrier slots 78 of the inner laminations during a subsequent die-casting operation. One advantage of keeping barrier slots 78 open is that starting torque may be improved. A disadvantage, however, is that pull-out torque may be decreased objectionable amounts.

It will be observed that the pole spans of the rotor and stator differ in the illustrated embodiment. For example, rotor assembly 41 has 30 squirrel cage slots 58 whereas stator core member 32 has 24 winding slots 38. This arrangement of rotor and stator slots reduces tooth order locking and thus increases starting torque. The avoidance of external quadrature reluctance slots or recesses, such as those shown at 30 in FIG. 1, provides a substantially cylindrical rotor member with accompanying improvement in starting torque. Direct axis barrier slots 62 and quadrature axis barrier slots 78 provide, internally of the rotor body, saliencies for synchronous operation and improve synchronous torque under adverse conditions of inertia and heating. Increasing the width of the cross slot bridges 82 at the ends of the quadrature axis barrier slots 78 tends to decrease synchronous pull-out torque and to increase synchronous pull-in torque with an inertia load. Thus, bridges 82 are adjusted to obtain the best balance between synchronous pull-in torque with an inertia load and pull-out torque. It should be noted that, for a given lamination design, increasing the size of bridges 82 in effect decreases the slots 78.

It thus will be understood that preselecting the size or width of bridges 82 provides a convenient means of establishing a desired predetermined balance between synchronous pull-in torque with an inertia load and pull-out torque. For example, in many applications for three phase synchronous motors (e.g., in textile mill applications) pull-out or basic synchronous torque is relatively important and, when possible, maximized. Accordingly, for these applications, the slots 78 would be increased in size so that the preselected width of bridges 82 would be relatively small. On the other hand, in applications such as those represented by many so-called business machine applications, the preselected width of bridges 82 would be relatively great in order to tend to maximize pull-in torque, particularly under adverse conditions such as, e.g., a hot rotor condition. In the case of laminations for the rotor of FIG. 2, the bridges 82 were about 0.030 of an inch.

It should be understood, that preselecting the width of bridges 82 predetermines what may be termed the "saturation characteristics" of the bridges and provides a means of fulfilling the desirable objective of balancing the pull-in and pull-out torques of a motor for a given application.

It might be thought that the provision of a number of squirrel cage slots which is not evenly divisible by the total number of poles would adversely affect the operating characteristic of the motor, however, I have found that such does not occur and that improved starting torque due to a reduced tendency for tooth order locking is obtained.

The following Table I compares the operating characteristics (in ounce-inches) of two single phase reluctance synchronous motors, A and B, having a rotor assembly construction as described in conjunction with FIG. 1; and of two single phase reluctance synchronous motors, C and D, using an improved rotor construction as described in conjunction with FIG. 2. All of these motors were operated as permanent capacitor motors during the tests from which data for Table I were obtained and same bearing and four-pole stator assembly was used for all tests. The stator was wound with winding turns the same as those of windings 44, 46, 52, 50 described hereinabove.

TABLE I

| | A | B | C | D |
|---|---|---|---|---|
| PULL-OUT TORQUE | 118.5 | 115 | 105.5 | 108.5 |
| PULL-IN TORQUE | 117.8 | 114.4 | 105 | 107.8 |
| PULL-IN TORQUE (Inertia) | 50.2 | 40.7 | 59.5 | 59.6 |
| PULL-IN TORQUE (Inertia) HOT | 27.1 | 20.3 | 46 | 44.8 |
| STARTING TORQUE (Permanent Split Capacitor) | about −36 | about −36 | 24 | 29.25 |

The data presented in Table I indicates that motors embodying the invention exhibited positive rather than negative starting torque characteristics. The useful starting torque of motors C and D permits the use of motors C, D in many applications (e.g., in business machines) where motors A and B could not be used. Furthermore, the pull-in torque (with inertia) of motors C and D was improved as compared to that of motors A and B. Somewhat surprisingly and advantageously, the pull-in torque under adverse conditions (with inertia and while hot) of motors C and D was almost twice as great as that of motors A and B, while the basic synchronous pull-out and pull-in torque was not reduced by objectionable or unacceptable amounts.

As will be understood, in a reluctance synchronous motor, the magnetic structure of the rotor defines the direct and quadrature axes, with the paths of minimum or lesser reluctance determining the location of the direct axes. In the preferred exemplification, the shaft of the rotor assembly does not have any substantial affect on the paths of minimum and maximum reluctance in the rotor body and thus will not substantially affect the location of the direct and quadrature axes. Accordingly, the shaft of a rotor such as motor 32 may be made of either ferromagnetic or nonferromagnetic material if desired. Furthermore, the saturable bridge 70 which is useful in providing this desirable feature is also, in effect, a web that mechanically holds together and interconnects the hub portion 67 (having an inner circular shaft accommodating peripheral surface) of each lamination with the balance of that lamination. Thus, the saturable bridges 70 provide a means of adequately, without additional structure or webs, mechanically interconnecting a shaft with the direct axis flux carrying magnetic structure of the rotor laminations; and a means of controlling quadrature axis reluctance of the rotor (e.g., by minimizing the flow of quadrature axis flux through the shaft region or hub 67 region of the rotor) while permitting the rotor core (and laminations thereof) to have a round or cylindrical configuration, if desired. For purposes of exemplification only, the bridges 70 had a width of about 0.040 inches in the FIG. 2 construction. With round laminations as shown, external reluctances are not provided (as discussed previously hereinabove). Thus, rotor bodies comprising these laminations will have a substantially continuous cylindrical peripheral surface and will not have peripheral recesses for use in controlling quadrature axis flux flow.

Advantages of constructions embodying the invention, other than those mentioned above include, inter alia, the elimination of relays and surge resistors that have been used with some prior constructions (e.g., as shown in FIG. 1 herein) for some applications; and the ability to use a single rotor assembly for different type of single phase motor stator winding designs.

Although various slots and openings in laminations and rotor bodies have been described above as structural features, it is to be understood that regions or portions of the magnetic material surround or otherwise define the extent of such openings and slots.

In the preferred embodiment, the two distinct regions of the rotor body, represented by magnetic bridges 70 and 82, are saturable during synchronous operation while under load. These bridges are of sufficient size that common lamination iron may be used if desired. Thus, it is not necessary in the preferred embodiment to use silicon steel or other material that saturates more sharply and at lower flux densities than common lamination steel or iron although that approach was necessary in some prior approaches, e.g., because of the relatively small bridges between shaft 14 and slots 20 in the structures represented by FIG. 1.

It should be apparent to those skilled in the art that while I have shown and described what at present is considered to be a preferred embodiment of my invention in accordance with the Patent Statutes, changes may be made in the structure and arrangements disclosed without actually departing from the true spirit and scope of the invention. For example, the invention may be utilized in conjunction with motors and motor parts designed for other than four-pole operation and for polyphase as distinguished from single phase operation. Moreover, when utilized in conjunction with motors designed for single phase operation, resistance split phase start; capacitor start-induction run; and permanent capacitor winding arrangements may be utilized. I therefore intend to cover in the following claims all such variations as fall within the invention.

What I claim as new and desire to secure by Letters Patent of the United States is:

1. An alternating current, reluctance synchronous motor comprising a shaft, a rotor body, and a stator assembly including a magnetic stator core having at least one winding and a rotor accommodating locale; said rotor body including a magnetic material rotor core comprising a plurality of laminations, said core having rotor conductor receiving slots therein and a substantially round peripheral configuration adjacent the rotor accommodating locale of the stator core, and further including rotor winding conductors positioned in at least some of the conductor receiving slots; said rotor core having a generally round cross-sectional peripheral shape adjacent the rotor accommodating locale of the stator core; the magnetic material of the rotor body defining regions of magnetic reluctance greater than the magnetic reluctance of the magnetic material thereby to establish the location of quadrature and direct axes of the rotor, said regions including at least one slot disposed across a quadrature axis; at least some of said laminations including a plurality of magnetic material webs of adequate strength to structurally interconnect the magnetic material adjacent the conductor receiving slots and said shaft; each of said webs forming a magnetic bridge adjacent to a quadrature axis and saturable during synchronous motor operation thereby to limit the magnetic flux flow along at least one of the rotor axes toward the shaft and thereby to permit the use of ferromagnetic shaft material but not require reliance upon the shaft to provide a low reluctance path for direct axis flux during operation.

2. The motor of claim 1 wherein the rotor accommodating locale of the stator assembly is a rotor receiving bore and wherein a rotor assembly comprising said shaft and said rotor body are disposed within the bore of said stator assembly; said rotor core including a magnetic material hub portion disposed about said shaft and interconnected with the other magnetic material of the rotor only by means of said webs.

3. An alternating current reluctance synchronous motor comprising a stator assembly having a bore therein and winding means for establishing a magnetic field having a predetermined number of pairs of opposite poles, and a rotor body mounted on a shaft and rotatably positioned in the bore; said rotor body including a core formed of a plurality of magnetic material laminations, at least some of the laminations having a plurality of angularly spaced apart first slots adjacent a peripheral surface thereof, a short-circuited squirrel cage winding having conductors respectively positioned in the first slots for establishing the same predetermined number of pairs of opposite poles at said peripheral surface with a direct magnetic axis extending through each of the poles and a quadrature axis extending between adjacent direct magnetic axes; at least some of said laminations including at least one quadrature axis flux barrier slot extending across a quadrature axis, and also including the same predetermined number of pairs of first flux barrier slots with each of the first flux barrier slots having a direct axis passing therethrough, each of the first barrier slots having a radially outer portion extending radially away from the shaft and extending radially inwardly from the radially outer portion thereof toward the shaft and terminating at an inner end, the inner end of each of the first flux barrier slots having angularly spaced apart arcuately extending inner extremities, at least one of the spaced apart inner extremities of one first flux barrier slot being spaced from an inner extremity of a first flux barrier slot adjacent thereto to mutually form a saturable magnetic bridge adjacent to a quadrature axis and extending between the extremities of said one first flux barrier slot and said first flux barrier slot adjacent thereto.

4. The structure of claim 3 wherein the at least one quadrature axis flux barrier slot extending across a quadrature axis is closely spaced from at least two of the first slots to thereby form saturable bridges, the configuration and arrangement of the flux barrier slots providing a relatively low reluctance path for direct axis flux and a relatively high reluctance path for quadrature axis flux during operation of the motor.

5. The structure of claim 4 wherein the opposite sides of each of the first flux barrier slots establish boundaries of relatively low reluctance flux paths between rotor poles of opposite polarity.

6. The structure of claim 4 wherein each of the first flux barrier slots is generally symmetrical about a respective direct axis, and the at least quadrature axis flux barrier slot is generally symmetrical about a respective quadrature axis.

7. An alternating current reluctance synchronous motor comprising a stator assembly having a bore therein and winding means for establishing a magnetic field having a predetermined number of pairs of opposite poles, and a rotor body mounted on a shaft and rotatably positioned in the bore; said rotor body including a core of magnetic material having a plurality of angularly spaced apart first slots adjacent a peripheral surface thereof, a short-circuited squirrel cage winding having conductors respectively positioned in the first slots for establishing the same predetermined number of pairs of opposite poles at said peripheral surface with a direct magnetic axis extending through each of the poles and a quadrature axis extending between adjacent direct magnetic axes; said core also including the same predetermined number of pairs of first flux barrier slots with each of the first flux barrier slots having a direct axis passing therethrough, each of the first barrier slots having a radially outer portion extending radially away from the shaft and extending radially inwardly from the radially outer portion thereof toward the shaft and terminating at an inner end, the inner end of each of the first flux barrier slots having angularly spaced apart inner extremities, and at least one of the spaced apart inner extremities of one first flux barrier slot being spaced from an inner extremity of another first flux barrier slot to form a saturable bridge therebetween; and at least one direct axis being angularly displaced from a one hundred and eighty electrical degree relationship with a direct axis mechanically adjacent thereto.

8. The structure of claim 7 wherein the number of first slots in the rotor body is not evenly divisible by the predetermined number of pairs of poles and the first flux barrier slots are positioned relative to the first slots to reduce tooth order locking.

9. An alternating current, reluctance synchronous motor comprising a shaft, a rotor body, and a stator assembly including a magnetic stator core; said rotor body including a shaft receiving passage and a magnetic material rotor core formed of a plurality of magnetic rotor laminations; each of said rotor laminations having an axially extending shaft receiving passage, generally round cross-sectional peripheral shape, and a plurality of slots therein, and rotor winding conductors positioned in at least some of the slots; at least some of said rotor laminations having at least one pair of spaced apart polar regions with direct and quadrature axes passing, respectively, therethrough and therebetween; the at least one pair of polar regions being at least partly determined by at least two slots each having a portion thereof adjacent a first saturable magnetic bridge and by at least one other slot having a portion thereof adjacent another saturable magnetic bridge; the first saturable magnetic bridge being positioned in the vicinity of the shaft receiving passage, substantially the entire low reluctance path for flux flowing between the polar regions on either side of the first quadrature axis being between the first saturable magnetic bridge and the outer periphery of the rotor body; the another saturable magnetic bridge being located radially outwardly from the first saturable magnetic bridge and within the arcuate expanse of the rotor body between the polar regions on either side of the first quadrature axis.

10. The structure of claim 9 wherein one of the at least two slots is a first flux barrier slot along a direct axis and the first saturable magnetic bridge is located adjacent an extremity of the first flux barrier slot.

11. The structure of claim 9 wherein the rotor body includes a plurality of conductor accommodating slots in the vicinity of the outer periphery thereof and spaced apart between the polar regions on either side of the first quadrature axis and wherein the at least one other slot is a flux barrier slot extending across the first quadrature axis; the second one of the saturable bridges being located between the flux barrier slot and one of the conductor accommodating slots.

12. The structure of claim 9 wherein at least one of the saturable magnetic bridges is of a dimension preselected to establish a predetermined balance between synchronous pull-out and pull-in torque of the motor.

13. An alternating current reluctance synchronous motor comprising a stator assembly having a bore therein and winding means for establishing a magnetic field having a predetermined number of pairs of opposite poles, and a rotor body mounted on a shaft and rotatably positioned in the bore; said rotor body including a core of magnetic material laminations; a plurality of said laminations having a generally round peripheral shape and a plurality of angularly spaced apart first slots adjacent a peripheral surface thereof, a short-circuited squirrel cage winding having conductors respectively positioned in the first slots for establishing the same predetermined number of pairs of opposite poles at said peripheral surface with a direct magnetic axis extending through each of the poles and a quadrature axis extending between adjacent direct magnetic axes; said core including at least one saturable magnetic bridge disposed across a quadrature axis, and also including the same predetermined number of pairs of first flux barrier slots with each of the first flux barrier slots having a direct axis passing therethrough, and at least one second flux barrier slot disposed between two adjacent ones of the first flux barrier slots, the at least one second flux barrier slot extending across a quadrature axis.

14. The structure of claim 13 wherein the at least one second flux barrier slot is closely spaced from at least one of the first slots to thereby form at least one saturable bridge.

15. A rotor for a reluctance synchronous motor, the rotor comprising a rotor body including a core of magnetic material having a plurality of angularly spaced apart first slots adjacent an outer peripheral surface thereof, a short-circuited squirrel cage winding having conductors respectively positioned in the first slots for establishing a predetermined number of pairs of opposite poles at said peripheral surface with a direct magnetic axis extending through each of the poles and a quadrature axis extending between adjacent direct magnetic axes; said core also including the same predetermined number of pairs of first flux barrier slots with each of the first flux barrier slots having a direct axis passing therethrough, each of the first barrier slots having a radially outer portion extending radially away from the center of the rotor body and extending radially inwardly from the radially outer portion thereof toward a shaft receiving portion of the rotor body and terminating at an inner end, the inner end of each of the first flux barrier slots having angularly spaced apart inner extremities, at least one of the spaced apart inner extremities of one first flux barrier slot being spaced from an inner extremity of another first flux barrier slot adjacent thereto to form a saturable magnetic bridge between the extremities thereof and adjacent to a quadrature axis; said core further including at least one slot disposed across a quadrature axis and lying radially outwardly from a saturable magnetic bridge.

16. The structure of claim 15 wherein the at least one second flux barrier slot is closely spaced from at least one of the first slots to thereby form a saturable bridge, the configuration and arrangement of the flux barrier slots providing a relatively low reluctance path for direct axis flux and a relatively high reluctance path for quadrature axis flux through the rotor body.

17. The structure of claim 15 wherein the opposite sides of each of the first flux barrier slots establish boundaries of relatively low reluctance flux paths between rotor poles of opposite polarity.

18. The structure of claim 15 wherein each of the first flux barrier slots is generally symmetrical about a respective direct axis, and the at least one second flux barrier slot is generally symmetrical about a respective quadrature axis.

19. A rotor for a reluctance synchronous motor, the rotor comprising a rotor body including a core of magnetic material having a plurality of angularly spaced apart first slots adjacent an outer peripheral surface thereof, a short-circuited squirrel cage winding having conductors respectively positioned in the first slots for establishing a predetermined number of pairs of opposite poles at said peripheral surface with a direct magnetic axis extending through each of the poles and a quadrature axis extending between adjacent direct magnetic axes; said core also including the same predetermined number of pairs of first flux barrier slots with each of the first flux barrier slots having a direct axis passing therethrough, each of the first barrier slots having a radially outer portion extending radially away from the center of the rotor body and extending radially inwardly from the radially outer portion thereof toward a shaft receiving portion of the rotor body and terminating at an inner end, the inner end of each of the first flux barrier slots having angularly spaced apart inner extremities, at least one of the spaced apart inner extremities of one first flux barrier slot being spaced from an inner extremity of another first flux barrier slot to form a saturable bridge therebetween; and at least one direct axis being angularly displaced from a one hundred and eighty electrical degree relationship with a direct axis mechanically adjacent thereto.

20. The structure of claim 19 wherein the number of first slots in the rotor body is not evenly divisible by the predetermined number of pairs of poles and the first flux barrier slots are positioned relative to the first slots to reduce tooth order locking.

21. A rotor for use in a synchronous motor, said rotor comprising a rotor body having a rotor core formed of a plurality of magnetizable laminations each having an axially extending shaft receiving passage and a plurality of slots therein, and rotor winding conductors positioned in at least some of the slots; at least some of said laminations having a generally round peripheral configuration; said rotor body having at least one pair of spaced apart polar regions with direct and quadrature axes passing, respectively, therethrough and therebetween; the at least one pair of polar regions being at least partly determined by at least two slots each having a portion thereof adjacent a first saturable magnetic bridge and by at least one other slot having a portion thereof adjacent another saturable magnetic bridge; the first saturable magnetic bridge being positioned adjacent a quadrature axis in the vicinity of the shaft receiving passage with substantially the entire low reluctance path for flux flowing between the polar regions on either side of the first quadrature axis being between the first saturable magnetic bridge and the outer periphery of the rotor body; the another saturable magnetic bridge being located radially outwardly from the first saturable magnetic bridge and within the arcuate expanse of the rotor body between the polar regions on either side of the first quadrature axis said another saturable bridge being at least partly defined by a quadrature axis slot that extends across a quadrature axis.

22. The structure of claim 21 wherein one of the at least two slots is a first flux barrier slot along a direct axis and the first saturable magnetic bridge is located adjacent an extremity of the first flux barrier slot.

23. The structure of claim 21 wherein the rotor body includes a plurality of conductor accommodating slots in the vicinity of the outer periphery thereof and spaced apart between the polar regions on either side of the first quadrature axis; the second one of the saturable bridges being located between the quadrature axis flux barrier slot and one of the condcutor accommodating slots.

24. A rotor for a reluctance synchronous motor comprising a rotor body having a core of magnetic material with a plurality of angularly spaced apart first slots adjacent a peripheral surface thereof; a short-circuited squirrel cage winding having conductors respectively positioned in the first slots for establishing a predetermined number of opposite poles at said peripheral surface with a direct magnetic axis extending through each of the poles and a quadrature axis extending between adjacent direct magnetic axes; said core including a plurality of generally round laminations and said core having the same predetermined number of pairs of first flux barrier slots that establish a saturable magnetic bridge adjacent a quadrature axis with each of the first flux barrier slots having a direct axis passing therethrough, and at least one second flux barrier slot disposed between two adjacent ones of the first flux barrier slots, the at least one second flux barrier slot extending across a quadrature axis.

* * * * *

PO-1050
(5/69)

UNITED STATES PATENT OFFICE
CERTIFICATE OF CORRECTION

Patent No. 3,758,800                    Dated September 11, 1973

Inventor(s)   Herbert L. McLaughlin

It is certified that error appears in the above-identified patent and that said Letters Patent are hereby corrected as shown below:

In column 8, line 29, change "type" to --types--.

In column 10, line 18 (claim 6, line 3), insert --one-- after "least".

Signed and sealed this 23rd day of April 1974.

(SEAL)
Attest:

EDWARD M. FLETCHER, JR.　　　　　　　C. MARSHALL DANN
Attesting Officer　　　　　　　　　　Commissioner of Patents